United States Patent
Sievert et al.

(10) Patent No.: US 9,799,139 B2
(45) Date of Patent: Oct. 24, 2017

(54) ACCURATE IMAGE ALIGNMENT TO A 3D MODEL

(71) Applicant: Apple Inc., Cupertino, CA (US)

(72) Inventors: Andreas Maximilian Sievert, Linkoping (SE); Viktor Kolbe, Linkoping (SE)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 14/030,714

(22) Filed: Sep. 18, 2013

(65) Prior Publication Data

US 2014/0267254 A1 Sep. 18, 2014

Related U.S. Application Data

(63) Continuation of application No. PCT/EP2011/054155, filed on Mar. 18, 2011.

(51) Int. Cl.
*G06T 17/00* (2006.01)
*G06T 17/05* (2011.01)
*G06T 7/73* (2017.01)

(52) U.S. Cl.
CPC .............. *G06T 17/00* (2013.01); *G06T 7/75* (2017.01); *G06T 17/05* (2013.01)

(58) Field of Classification Search
None
See application file for complete search history.

(56) References Cited

U.S. PATENT DOCUMENTS

| | | | | |
|---|---|---|---|---|
| 6,075,905 A | * | 6/2000 | Herman | ................... G06K 9/32 348/588 |
| 2001/0043738 A1 | * | 11/2001 | Sawhney | ................ G01S 5/163 382/154 |
| 2006/0188131 A1 | * | 8/2006 | Zhang | ................... G06T 7/0044 382/103 |
| 2007/0031064 A1 | * | 2/2007 | Zhao | .................. G06K 9/00214 382/285 |

(Continued)

FOREIGN PATENT DOCUMENTS

| CN | 101978394 A | 2/2011 |
|---|---|---|
| KR | 100580585 | 5/2006 |

OTHER PUBLICATIONS

Crispell "A Continuous Probabilistic Scene Model for Aerial Imagery", May 2010.*

(Continued)

*Primary Examiner* — Yingchun He
(74) *Attorney, Agent, or Firm* — Blank Rome LLP

(57) ABSTRACT

Methods and devices for acquiring, and aligning, an image with a textured three-dimensional (3D) model are described. In one implementation, aligning can include rendering an image in the 3D model at an estimated pose and then aligning the acquired image with the rendered image. In another implementation, aligning can include projecting the acquired image onto the 3D model at an estimated pose and then aligning the projected acquired image with the textured 3D model. In still another embodiment, aligning can include projecting the acquired image onto the textured 3D model, rendering a first image in the original 3D model and a second image in the 3D model onto which the acquired image has been projected, and then aligning the first and second images.

20 Claims, 9 Drawing Sheets

(56) References Cited

U.S. PATENT DOCUMENTS

2008/0221843 A1 9/2008 Shenkar
2009/0322742 A1* 12/2009 Muktinutalapati ... G06T 7/0028
  345/420

OTHER PUBLICATIONS

Xiao et al. "Image-based Façade Modeling", ACM Transactions on Graphics, vol. 27, No. 5 Article 151 Dec. 2008.*
Haala N et al: "An update on automatic 3D building reconstruction", ISPRS Journal of Photogrammetry and Remote Sensing, Amsterdam [U.A.] : Elsevier, vol. 65, No. 6, Nov. 1, 2010 (Nov. 1, 2010), pp. 570-580, XP027487903, ISSN: 0924-2716, DOI: DOI:10.1016/J.ISPRSJPRS.2010.09.006 [retrieved on Oct. 20, 2010].
Hu et al.: 'Integrating LiDAR, Aerial Image and Ground Images for Complete Urban Building Modeling' Proceedings of the Third International Symposium on 3D Data Processing, Visualization, and Transmission (3DPVT'06) 2006.
International Preliminary Report on Patentability received in PCT Application No. PCT/EP2011/054155, dated Jun. 26, 2013.
International Search Report received in PCT Application No. PCT/EP2011/054155, dated May 19, 2011.
Zitova B. et al: "Image Registration Methods: A Survey," Image and Vision Computing, Elsevier, Guildford, GB, vol. 21, No. 11, Oct. 1, 2003 (Oct. 1, 2003), pp. 977-1000, XP001189327, ISSN: 0262-8856, DOI: 10.1016/S0262-8856(03)00137-9.

* cited by examiner

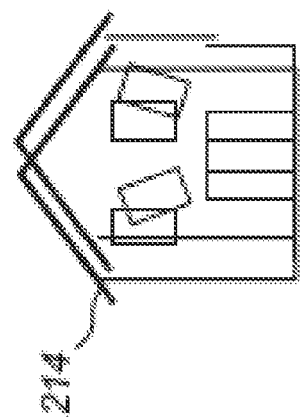
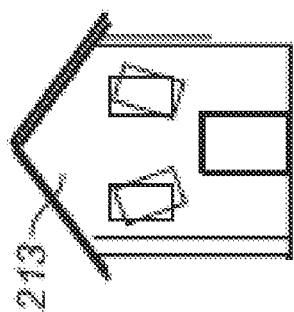
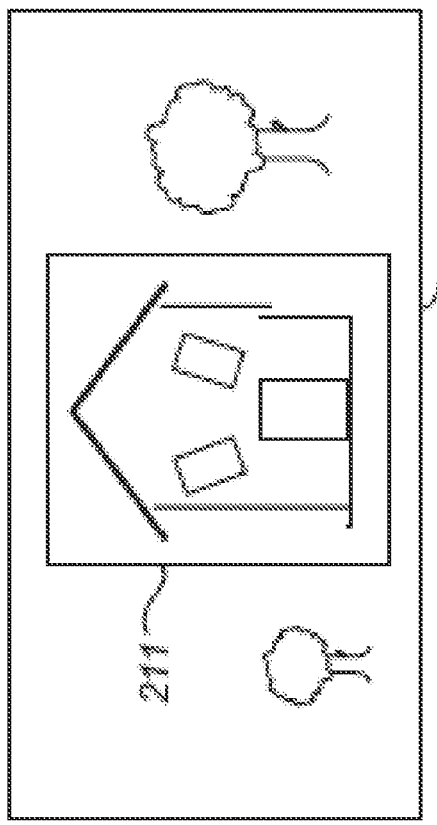
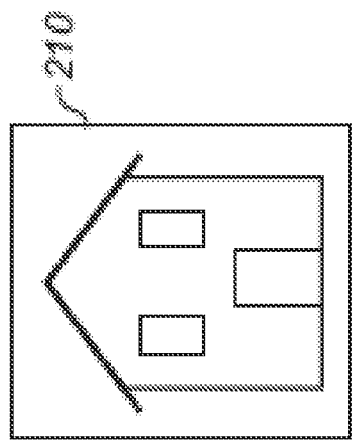
Fig. 2b

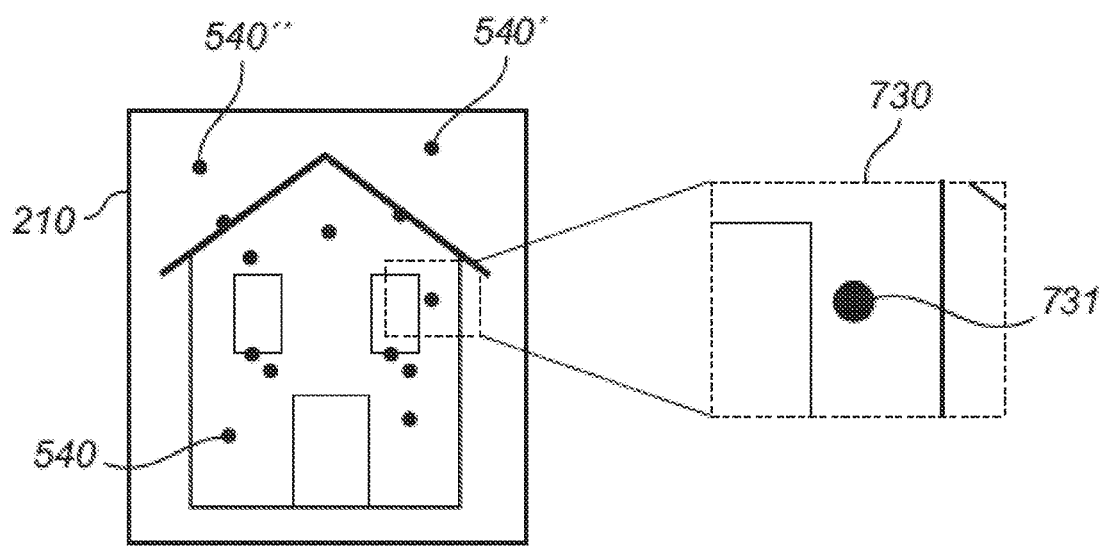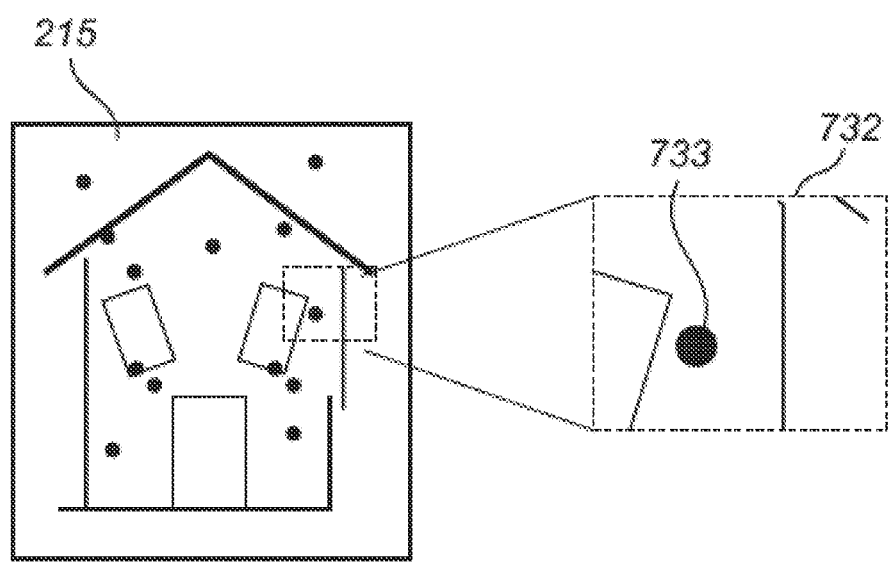
Fig. 7a

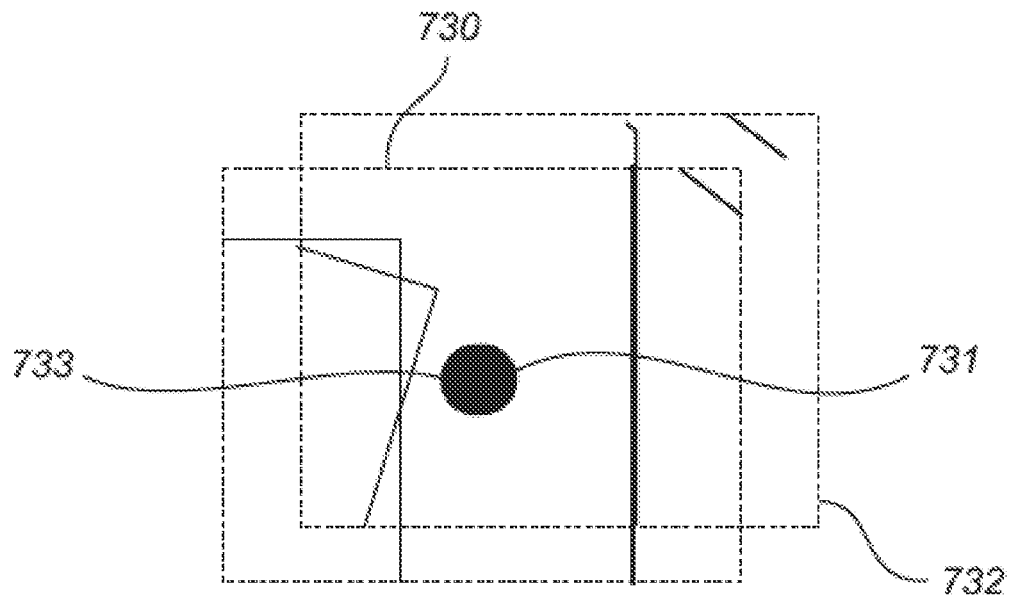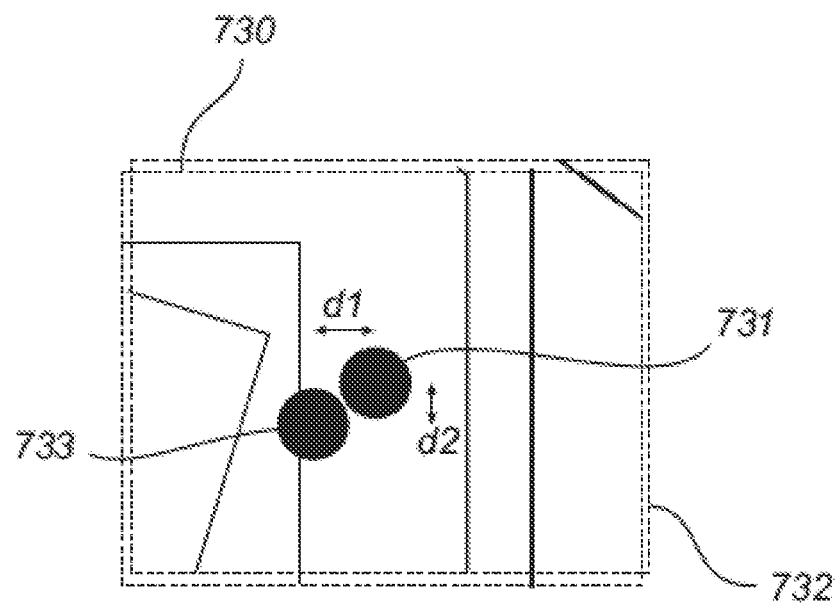
Fig. 7b

ACCURATE IMAGE ALIGNMENT TO A 3D MODEL

BACKGROUND

The present disclosure relates to a method and a device for positioning an acquired image, in particular a street-level image, using a textured three-dimensional (3D) model.

In the prior art, geographical information systems providing digital maps are well known. Typically, 3D maps are formed on the basis of images captured (or acquired) by an airplane scanning a section of terrain to be modeled in 3D. When capturing the images, camera position can be obtained by GPS, and the images further time stamped. The airplane is further equipped with an inertial measurement unit (IMU) such that the angles of rotation of the airplane, known as roll, pitch and yaw, can be recorded. Thus, both the position and attitude of the camera are recorded for each captured image.

Stereo processing of captured images can be performed, taking into account the position and attitude of the camera (referred to as navigation data). An image pair comprising overlapping image data captured at substantially the same point in time is related to the navigation data, whereby each respective pixel of the overlapping images can be associated with a geographical coordinate on the ground. Stereo processing implies that only those parts of the images are used which match with a corresponding area in the other image of the image pair. By subsequently using trigonometric functions, the distance from the camera plane to a given point on the ground can be calculated and a 3D map representation can be created.

Aerial images can be positioned with high accuracy, due to good GPS signal reception conditions in the airspace as well as the post processing possibilities gained with IMU equipment. 3D representations from such images result in high-accuracy geo-referenced 3D models with detailed high resolution textures. However, in order to accomplish 3D models having an even more realistic appearance, aerial imagery can be supplemented with street-level images or, similarly, with images captured at intermediate altitude. This can be accomplished by texturing the 3D model with the street-level imagery as well as by using the street-level imagery in the 3D reconstruction process. In order for either of these things to be possible, the street-level imagery must be positioned with high accuracy relative to the 3D model and the underlying 3D model must have enough detail in texture and geometry for the street-level imagery to have sufficient correspondence with the 3D model. Sufficient geo-referenced detail in the underlying 3D model is difficult to obtain with a box-like building representation, as the geometry and texture of these models seldom represent the real world accurately enough. However, with high-detail aerial 3D models, positioning of street-level imagery with sufficient accuracy is possible. With an accurate street-level pose, merging of street-level imagery as well as 3D reconstruction of even more complex surfaces such as curved surfaces, balconies, decorations or elaborated window frames is possible. Thus, the authentic appearance of the aerial 3D representation is enhanced by adding details from the street-level images.

One prior approach to accomplishing this relies on a hybrid modeling system that fuses Light Detection And Ranging (LiDAR) data, aerial images, and ground-view images for creation of accurate 3D building models. Outlines for complex building shapes are interactively extracted from a high-resolution aerial image. Surface information is automatically fitted using a primitive based method from LiDAR data, and high-resolution ground view images are integrated into the model to generate fully textured CAD models.

While 3D modeling using aerial images generally results in high-quality positioning, street-level 3D modeling typically suffers from lower-quality positioning. Factors such as, for instance, GPS signal shadows due to obstacles, signal distortions and the drifting of IMU data in the relatively varied motion of street-level vehicles deteriorate measurements on ground level. This causes the recorded position of street-level images to be inaccurate. Further, mechanical and optical properties of a given real camera differ from those of an assumedly identical camera, resulting in incorrect measurements. Yet a further problem is that alignment of images captured at angels differing greatly is troublesome since it will be difficult to find overlapping image data. Thus, when projecting street-level images onto a 3D model derived from aerial images, there is a significant risk of mismatch since the pose of the ground-level camera used for capturing the street-level images does not comply with the geographic referenced details of the aerial 3D model.

SUMMARY

Various embodiments seek to improve prior art methods of positioning captured (or acquired) images and, in particular, captured street-level images. In one embodiment, a method and device for positioning an image using a textured 3D model of a region of space is described. The method includes acquiring an image to be positioned (representing at least a portion of the region of space), the image having an initial pose, aligning the acquired image with the 3D model to obtain a new estimated pose (using, at least in part, texture information contained in the 3D model), and positioning the acquired image using said new estimated pose. A device in accordance with this embodiment includes processing means for performing these operations.

For the purposes of this disclosure, a pose is taken to mean a camera position and attitude. The terms texturing and texture information are given their ordinary meanings in the field of computer graphics and geometric modeling. Texturing may be based on photographic data or the manual input of graphic information, in particular by assigning color values to surfaces in a 3D model. The operation of capturing (or acquiring or recording) an image may refer to encoding, in computer-readable form, light incident at an imaging device, such as a camera. Image acquisition may in particular be performed by known procedures in digital photography. Furthermore, it is understood that the phrase street-level image is used not only for images acquired substantially at ground level at a substantially horizontal camera attitude, but may also refer more generally to any (2D) image depicting a portion of a region of space that is represented by a textured 3D model. Such a picture may be acquired by a ground-level camera or an elevated camera located in a mobile or built structure, an aircraft or the like. It is clear that an acquired (street-level) image in this sense may contain visible features appearing in the textured 3D model as well, and so the acquired image may be positioned with respect to the coordinates used in the textured 3D model.

By its use of texture information, techniques in accordance with this disclosure may be applicable more broadly than prior art approaches. In particular, this disclosure provides for positioning of an image that has not been acquired at street level and thus lacks a skyline or similar structure; in such an image, texture features are more often available than a skyline is, and this allows the image to be positioned with the 3D model by using the texture information contained therein.

In one embodiment, a method and device are provided for acquiring an image to be positioned with the textured 3D model and rendering an image in the 3D model at an estimated pose of the acquired image. The acquired image may then be aligned with the rendered image, wherein a new estimated pose of the acquired image can be determined. The acquired image may be positioned using the new estimated pose. In all embodiments, the act of aligning may include translating, rotating and/or rescaling the acquired image, so that it differs from the rendered image to a reduced extent; a change of pose will in general imply that the image undergoes a combined translation, rotation and rescaling.

Advantageously, the positioning of the acquired image can be greatly improved by using an existing textured 3D model. For instance, aerial images well suited for stereo may initially be captured to create the 3D model. By adding texture to the 3D model, subsequent alignment with acquired (or captured) images can be be facilitated. Any known method of creating a 3D model with good-quality positioning and correctly placed textures can be used for positioning acquired images. As disclosed herein, an artificial (or rendered) image may be obtained at any pose in the textured 3D model, which in theory is identical to the corresponding acquired image. The ability to obtain an artificial image at any position in the textured 3D model allows for an unlimited set of rendered images to match the acquired image against. This further allows for the generation of an image at the estimated pose in order to validate the estimated pose.

In another embodiment, the act of aligning the acquired (street-level) image with the rendered image may further include matching the acquired image with the rendered image. The act of matching may include the process of correlating one or more points or areas in a first 2D image with corresponding points or areas in a second 2D image. Many prior art approaches to matching street-level imagery to a 3D model generated from aerial imagery, generally suffer from being sensitive to large changes in actual observation angle of photographs for the street-level images. The actual observation angle has great implications on, e.g., how similar the street-level image and the area of interest in the 3D model are. Rendering the images from the 3D model makes it possible to handle larger differences between original photographs. Further, the ability to render the image anywhere in the 3D model facilitates the handling of large initial pose estimate errors.

Prior pose estimation processes generally calculate depth of a feature point of two images from the pose difference between the images. That is, the depth is not known, only estimated in the same process that estimates the pose. In accordance with this disclosure, the depth can be extracted from the 3D model which is valuable for processing purposes. Known prior art feature matching methods include, e.g., scale-invariant feature transform (SIFT) and speeded up robust features (SURF).

In another embodiment, a difference between the rendered image and the acquired image can be determined and, thereafter, multiple images rendered in the immediate pose vicinity of the acquired image. Each of these multiple images may be compared to the acquired image. The rendered image having the smallest difference with respect to the acquired image may be selected for alignment. This can be advantageous since it is possible to obtain a rendered image which is a good estimate of the acquired image before alignment starts.

In another embodiment, a method and device are provided for acquiring an image (such as a street-level image) to be positioned with the textured 3D model and projecting the acquired image onto the textured 3D model at an estimated pose of the acquired image. The projected acquired image may be aligned with the textured 3D model, to produce a new estimated pose of the acquired image. The acquired image may then be positioned using the new estimated pose. The act of projecting may include sub-dividing the acquired image into one or more sub-regions and associating each (or at least some) with surfaces encoded in the textured 3D model. In embodiments of this nature, the act of matching may include correlating one or more points or areas of a first 2D texture on a surface in the existing textured 3D model with one or more points or areas of a second 2D texture resulting from the projection of the acquired image onto the (textured) 3D model. In other words, the second 2D texture may be a subset of the acquired image, and may possibly have undergone perspective deformations including non-uniform rescaling as a result of the projection. Alternatively, the act of matching may include associating points, surface areas or volumes in the existing textured 3D model with points, surface areas or volumes in the modified textured 3D model which results from projecting the acquired image onto the model.

In yet another embodiment, a method and device are provided for acquiring an image (such as a street-level image) to be positioned with a textured 3D model and projecting the acquired image onto the textured 3D model at an estimated pose of the acquired image. A first image can be rendered in the textured 3D model and a second image may be rendered using a same pose in the modified textured 3D model which results from projecting the acquired image onto the model. The projected acquired image may be aligned with the textured 3D model, wherein a new estimated pose of the acquired image can be determined. The acquired image may then be positioned using the new estimated pose. In this embodiment, the act of matching may include correlating one or more points or areas in a first rendered 2D image (in the existing textured 3D model) with one or more points or areas in a second rendered 2D image (in the modified textured 3D model which results from projecting the acquired image onto the model).

Different embodiments may include a act of (or processing means configured for) extracting information from the acquired image once positioned and to include this information into the textured 3D model. The information to be extracted may be of a geometric nature or may refer to textures of surfaces appearing on the textured 3D model.

It should be understood that this disclosure relates to, and encompasses, all possible combinations of features explained herein and recited in the claims which follow this description. Further features of, and advantages with, the various embodiments disclosed herein will become apparent when studying the appended claims and the following description. Those skilled in the art will realize that different features of the present invention can be combined to create embodiments other than those described in the following.

BRIEF DESCRIPTION OF THE DRAWINGS

FIG. 2b illustrates a first step in a positioning process according to this disclosure, in which an image is rendered in the 3D model using the street-level image pose;

FIG. 7a illustrates creation of an area surrounding each point in accordance with one embodiment;

FIG. 7b illustrates matching of areas surrounding a particular point of the acquired image to a corresponding area of the rendered image in accordance with one embodiment.

DETAILED DESCRIPTION

In order to improve positioning of street-level imagery using an existing textured 3D model in accordance with various embodiments described herein, aerial images well suited for stereo may initially be captured to create the 3D model. The 3D model may also be created initially on the basis of drawings or computer-aided design data. As an alternative to aerial images, the region of space to be modeled may be imaged using a camera carried by a satellite or other aircraft. Stereo processing implies that only those parts of the images are used which match with corresponding areas in the other image of the image pair. Firstly, an image pair comprising overlapping image data is captured at substantially the same point in time. Each image of the pair is related to a respective position and attitude. Depending on the quality to be obtained, each single pixel in the respective image can be related to position and attitude, or groups of pixels in the respective image can be related. By performing this correlation, each pixel of the overlapping images can be associated with a geographical coordinate on the ground, and a following transformation facilitates transformation of the images to a common ground plane.

By subsequently using known trigonometric functions, particularly in triangulation methods, the distance from the camera plane to a given point on the ground can be calculated, and a 3D model can ultimately be created. This 3D model may be textured for added detail, bringing color, intensity and structure to the 3D model. Further, by adding texture to the 3D model of, e.g., a building, subsequent alignment with captured (street-level) images may be facilitated. If for instance aerial images have been used to create the 3D representation, texture data are readily available from the aerial images themselves. Thus, selected captured images can be applied to the 3D representation to create textures and provide more detail. However, it should be noted that other known methods of creating a 3D model with good-quality positioning can be used to provide a textured 3D model used for positioning captured (street-level) images.

Figure 1A:
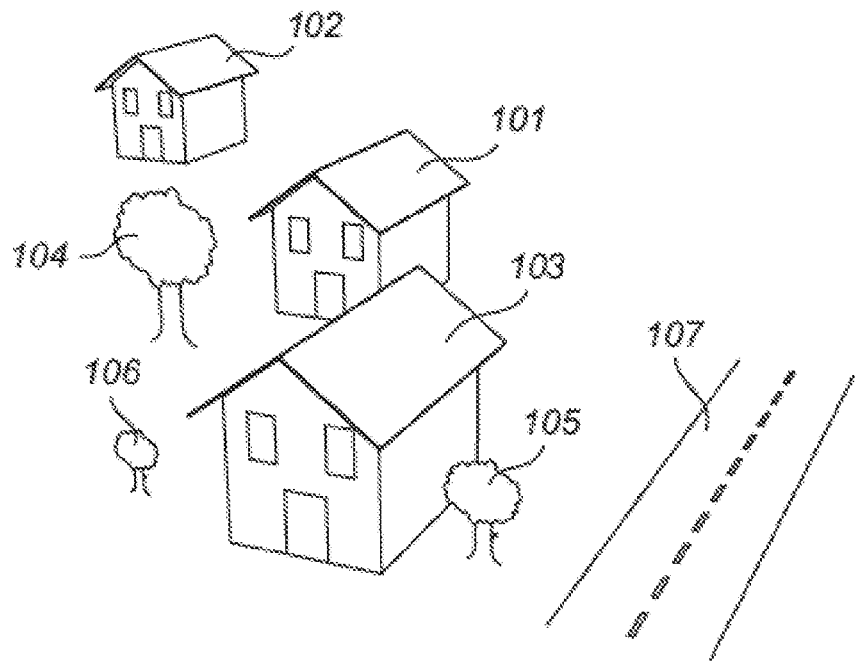
FIG. 1a shows a perfectly rendered 3D model of an area.
Figure 1B:
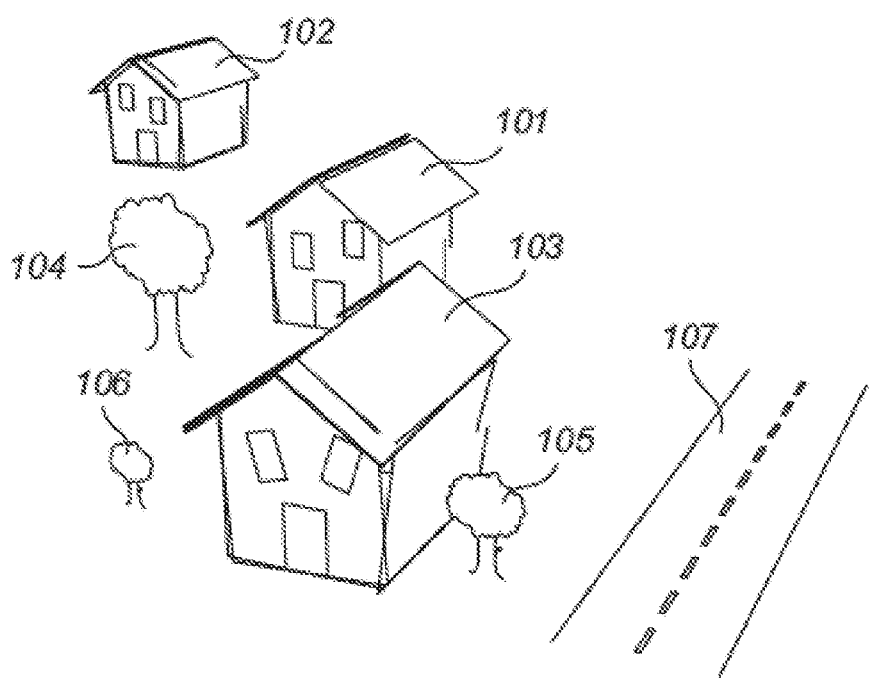
FIG. 1b shows a more realistically rendered 3D model of the same area.
Figure 2A:
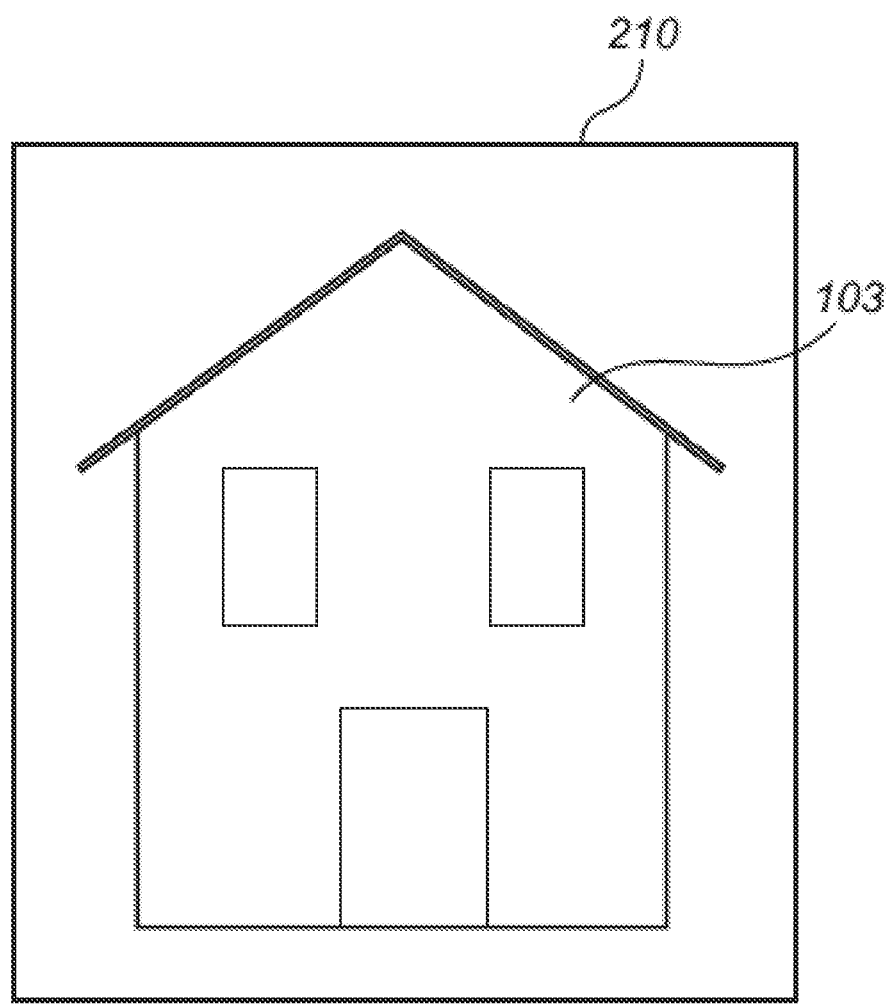
FIG. 2a shows a street-level image of an object to be positioned in the 3D model.

Now, in order to create an enhanced and even more realistic 3D model, (street-level) images of an object to be enhanced in a textured 3D model, e.g., a building may be captured, and an advantageous positioning process is proposed to position street-level imagery so that the imagery subsequently can be correctly aligned with the textured 3D model. This process will be described below. It should be noted that a great advantage of the process is that it is automated to a high degree. Thus, no manual manipulation, handling or processing is generally required. The positioning process can be implemented and run on a suitable computer on which adequate software has been installed. As input to the positioning process, a 3D model can be created and one or more (street-level) images captured. For illustrative purposes, FIG. 1a shows a perfectly rendered 3D model of an area comprising houses 101, 102, 103, a number of trees 104, 105, 106 and a stretch of a nearby road 107. In reality, this 3D model will exhibit imperfections, examples of which are shown in FIG. 1b. Since the resolution of the textured aerial 3D model generally is too low to be viewed in a rendering from street-level, the 3D model may sometimes suffer in quality. For example, the contours of houses 101, 102 and 103 may be slightly dislocated and discontinuous, and details such as the windows and the door on the front side of house 103 are not perfectly modeled. Note that the dislocations shown in FIG. 1b are highly exaggerated for illustrative purposes. In practice, the aerial 3D model is fairly good but will lack in resolution and detail. Thus, ground-level images can be captured and utilized to enhance and improve the (imperfect) aerial 3D model of FIG. 1b. FIG. 2a shows a ground-level image 210 of the front side of the house 103. This is a high-resolution texture image taken with a certain camera pose, which can be used to enhance the aerial 3D model.

With reference to FIG. 2b, the first step of the positioning process can be to render an image in the 3D model using the camera pose, which may be at street level. If the projection model of the camera is known, it can be used when rendering the image in the 3D model. FIG. 2b shows the image 211 rendered in the 3D model 212 using the camera pose and dimensions, which results in image data similar to the acquired image being rendered from the 3D model. Now, should the pose of the acquired (street-level) image have been in complete conformity with the geographical reference of the (aerial) 3D model, the rendered image would position-wise have been aligned with the acquired image, which is indicated at 213. Hence, in an ideal situation the rendered image and the acquired image would coincide. However, as has been discussed in the above, this is not the case in practice, and so there is always an undesirable mismatch in positioning, which is indicated at 214. For instance, both the acquired image and the rendered image may be processed using a gradient method, such as a Sobel filter. This way, edge-detection may be performed on the two images prior to feature detection.

Figure 3:
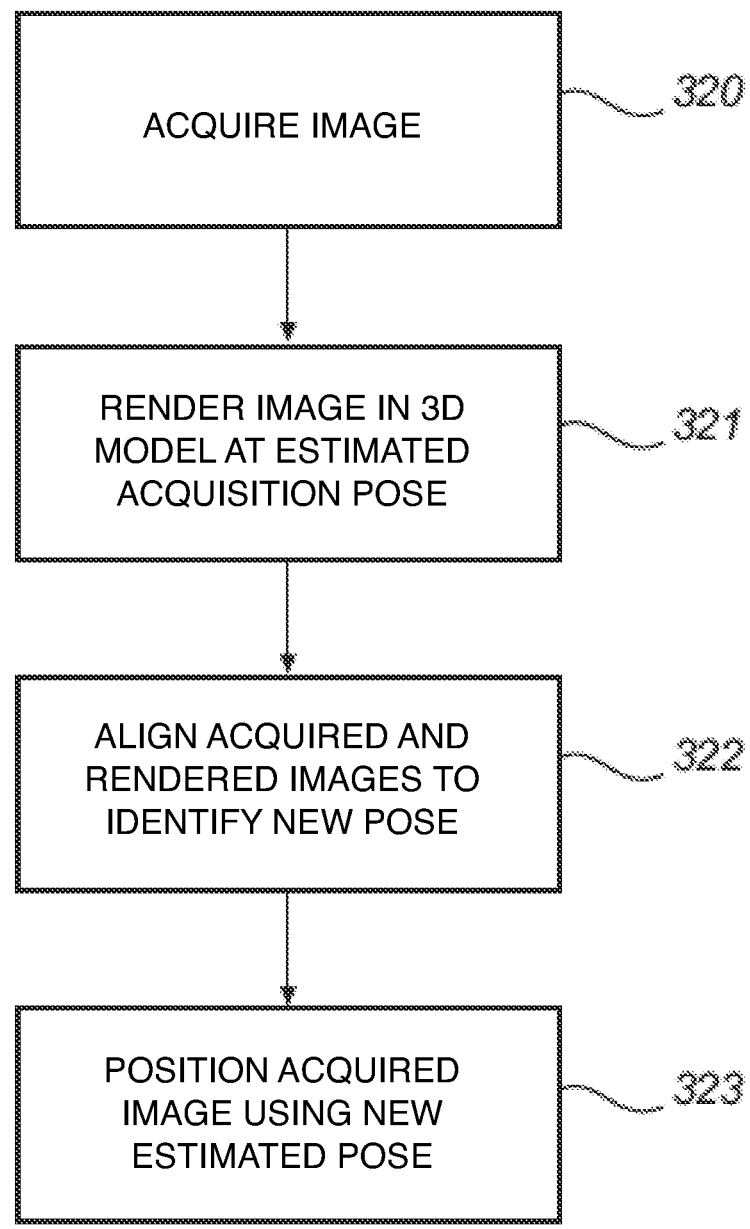
FIG. 3 is a flowchart illustrating a positioning process in accordance with one embodiment.

FIG. 3 illustrates an embodiment of a positioning process in accordance with one embodiment. As has been discussed in the above, an image to be positioned with the textured 3D model may be acquired in step 320, and an image can then be rendered in the 3D model at an estimated acquisition pose in step 321. That is, the pose that was utilized to capture the image can be used for rendering the image in the 3D model. In order to be able to attain a new and improved acquisition image pose and thus overcome the positioning mismatch problems illustrated at 214 in FIG. 2, the acquired image can be aligned with the rendered image in step 322, wherein a new estimated pose of the acquisition can be determined. Finally, in step 323, the acquired image may be positioned using the new estimated pose determined in the aligning step.

A first alternative for positioning an acquired image using a textured 3D model can first acquire an image to be positioned with the textured 3D model and then project the acquired image onto the textured 3D model at an estimated pose of the acquired image. The projected image may be aligned with the textured 3D model, wherein a new estimated pose of the acquired image is determined. Then, the acquired image may be positioned using said new estimated pose. Various embodiments set out in the following may be be applied to this alternative approach of positioning an acquired image.

A second alternative for positioning an acquired image using a textured 3D model is to acquire an image to be positioned with the textured 3D model and project the acquired image onto the textured 3D model at an estimated pose of the acquired image. A first image can be rendered in the textured 3D model and a second image can be rendered, using a same pose, in the textured 3D model resulting from the projection of the acquired image onto the 3D model. The projected image may be aligned with the textured 3D model, wherein a new estimated pose of the acquired image can be determined. Then, the acquired image can be positioned using the new estimated pose. As in the case of the first alternative, the embodiments set out in the following can be applied to this second alternative approach of positioning an acquired image.

Figure 4:
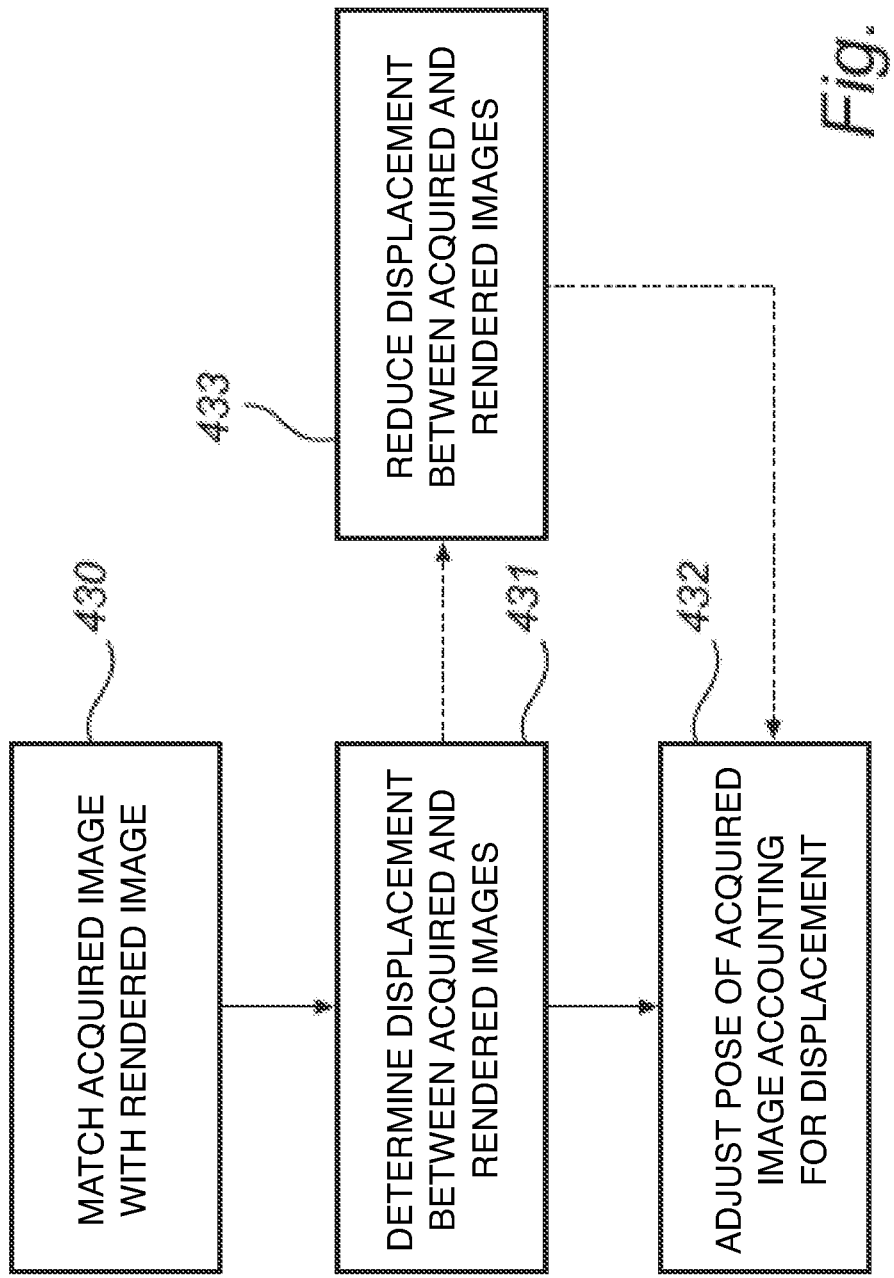
FIG. 4 is a flowchart illustrating a further embodiment.

FIG. 4 illustrates a further embodiment, wherein the aligning step 322 of FIG. 3 is undertaken by matching the acquired image with the rendered image in step 430. Thereafter, a displacement in image coordinates between the matched acquired image and rendered image in step 431 may be determined. Finally, the pose of the acquired image can be adjusted by taking into account the displacement in step 432. Thus, with reference back to step 323 in FIG. 3, the adjusted pose of the acquired image results in a new estimated pose.

In another embodiment, alignment may be undertaken by determining a difference between the rendered image and the acquired image. Thereafter, several images can be rendered in the immediate pose vicinity. The respective image rendered in the pose vicinity can then be compared to the acquired image. Ultimately, one of the rendered images at a new pose will exhibit a smaller difference, with respect to the acquired image, than any other of the rendered images. This rendered image can be selected for further processing.

Yet a further embodiment is illustrated with reference to FIG. 4. In this embodiment, before a new pose is estimated, a total displacement may be reduced by updating the pose of image acquisition until a minimum total displacement has been found, wherein this pose is adjusted by taking into account the minimum total displacement at step 433. That is, the pose of image acquisition is updated and the set of displacements registered, if the total displacement is not considered small enough, a new pose of image acquisition may be set and the corresponding set of displacements studied, and so on until a minimum total displacement has been found. Consequently, finding the minimum total displacement results in a new estimated pose at which the acquired image can be positioned.

Figure 5:
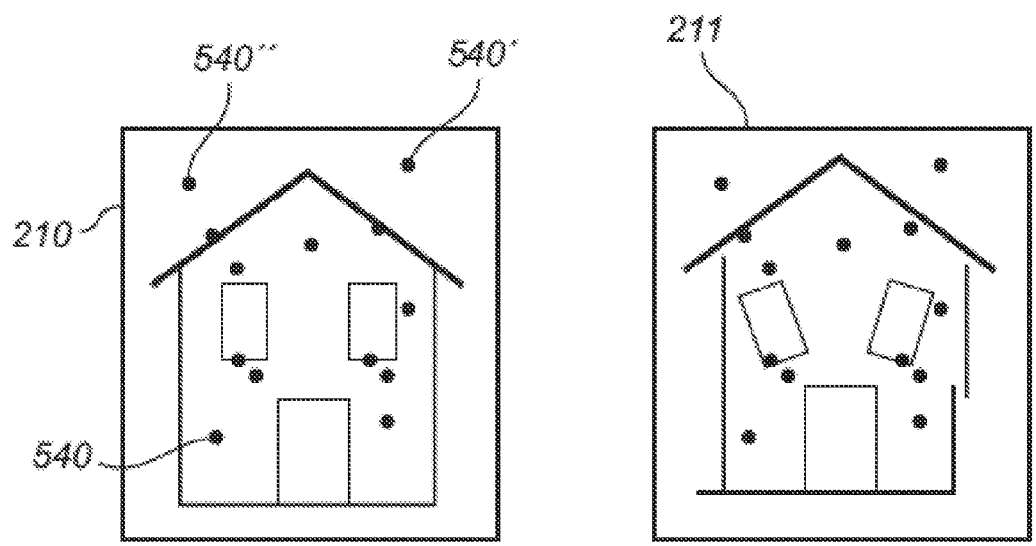
FIG. 5 illustrates alignment of the acquired image to the rendered image in accordance with one embodiment.

In one embodiment, with reference to FIG. 5, the aligning of the acquired image to the rendered image commences with the step of identifying a set of feature points 540 in the acquired image 210 with a corresponding set of points at the same image coordinates in the rendered image 215. In a further embodiment, points 540', 540" which would not be projected on a 3D model surface may be discarded, having the advantage that only data which contributes to the improved 3D model are used. This allows for an early removal of incorrectly matched points.

Using a scale space representation, correlation can be used to find matching feature points in each scale level. Consistency between the levels of the found matches may indicate a true match, as well as consistency between different correlation window size in each scale level.

In one embodiment, for the points determined to be feature points, 3D coordinates may be calculated using the aerial 3D model as the geographic reference, which can result in high-quality positioning as has been discussed previously. Thus, the feature points for which 3D coordinates have been calculated can be projected into the acquired image. Thereafter, a process can be undertaken to align the feature points pertaining to the acquired image data with those pertaining to the 3D model. The alignment of a set of feature points may be accomplished by minimizing the difference between the projected 3D points and the corresponding feature points in the rendered image with, for example, Newton-Raphson minimization combined with Random Sample Consensus (RANSAC) for outlier removal.

Figure 6:
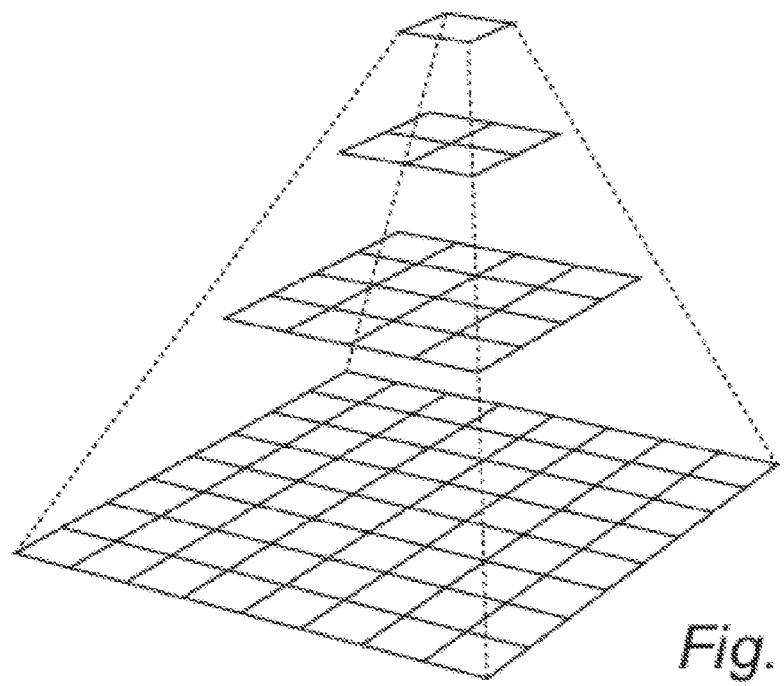
FIG. 6 illustrates a space scale representation, which is utilized in at least one embodiment.

In a further development of the preceding embodiment, a set of feature points 540 in the acquired image 210 may be identified with a corresponding set of points at the same image coordinates in the rendered image 215. After the set of points have been distributed in the respective image, feature matching between the acquired image and the rendered image can be undertaken. In one embodiment, this may be performed by generating a respective scale space representation of the acquired image and the rendered image. A scale space representation can be comprised of differently scaled image representations, referred to as levels, of the associated image. This is illustrated in FIG. 6 showing what is commonly referred to as a "Gaussian pyramid", where the base of the pyramid shows the image at original resolution and each subsequent level shows the image at half the resolution of the previous level. Creating and using scaled space representations can be an effective way of extracting features of different sizes in an image.

Figure 7C:
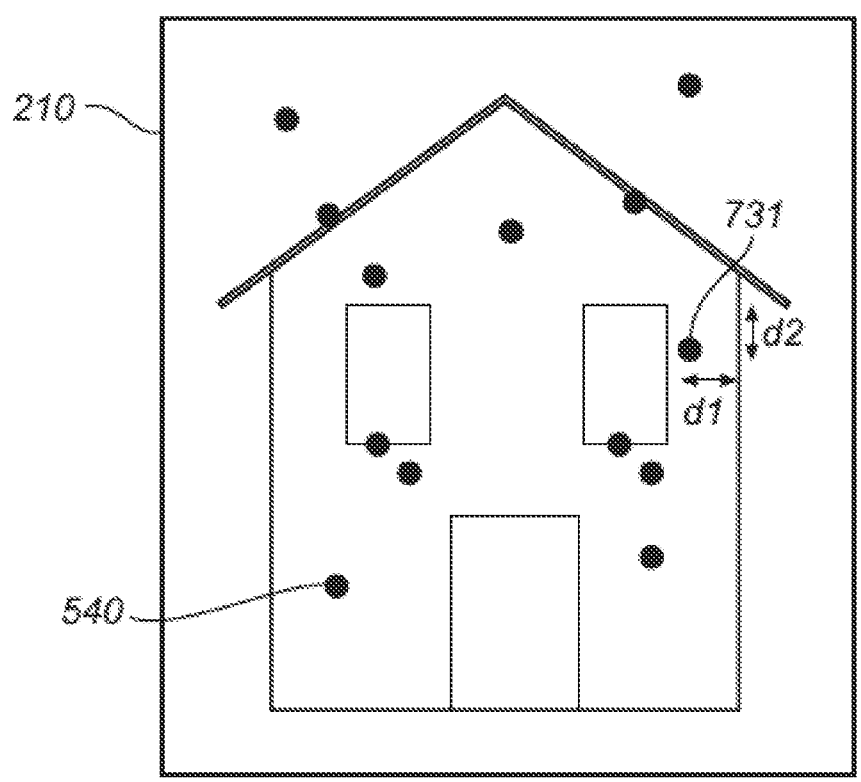
FIG. 7c illustrates correction of a matched point in the acquired image in accordance with one embodiment.

In another embodiment, described with reference to FIGS. 7a-c, for all—or a selected subset—of the points, a sub-image 730, 732 of an area surrounding a chosen point 731, 733 may be created in the acquired image and the rendered image, respectively. That is, a given area surrounding a chosen point is investigated. The size of the area may be determined by a selected correlation window used in the matching process as well as the area of the other sub-image. A trade-off can be made when selecting correlation window size. A larger sub-image suffers from precision loss due to image differences such as a different point of view, while it is more likely to find a correct position. A smaller sub-image is less prone to error resulting from image differences but more likely to find false matches. In practice, this correlation-based feature matching means that the selected acquired sub-image is moved within the rendered sub-image. For every move of the acquired sub-image in the rendered sub-image, the correlation between the two sub-images may be measured and an image coordinate with a maximum correlation value found, which is illustrated in FIG. 7b, wherein the top view in FIG. 7b shows the starting position and the bottom view illustrates a situation where a maximum correlation is found. This maximum-correlation image coordinate may yield a displacement vector (d1, d2) between the rendered sub-image and the acquired sub-image. If the displacement vector indicates a displacement which is too great, the correlated point may be discarded. Typically, this can be performed in every level of the scale representation and for every point, which results in a total measure of displacement. In one embodiment, if for a given point the position is consistent in several subsequent levels of the scale representation, the point may be accepted as a match. This matching process is performed for every point distributed in the two images. When using a correlation-based feature matching process as set out in the above, there is a potential risk of finding "false" matches or no matches at all, and therefore correlation is undertaken in a plurality of levels of the scale representation. Consistent positioning of a given point in several subsequent levels of the scale representation is an advantageous indicator for a "true" match. Further, this vastly improves the amount of features that are correctly matched. The small-size image at the top of the pyramid provides very few errors and thus handles large errors in pose. The base of the pyramid provides match on small details. Hence, if all the levels find the same image coordinate, it can be considered a very good match.

With reference to FIG. 7c, the estimated displacement vector can be used in an embodiment of the invention to correct the position of the matched point. The point considered to be a match, which was originally distributed in the acquired image, can now be set at the coordinate of the corresponding feature by taking into account the displacement (d1, d2). These points are referred to in the following as feature points. When feature matching has been made, the pair of correlation values associated with each point may be evaluated. In one embodiment, a threshold may be set for the correlation values, and if the correlation values are below the threshold they may be discarded. As has been discussed above, the remaining points can be considered to be a match.

In another embodiment, for the points determined to be feature points, 3D coordinates may be calculated using the aerial 3D model as the geographic reference, which can result in high-quality positioning as has been discussed previously. Thus, the feature points for which 3D coordinates have been calculated may be projected into the acquired image. Thereafter, a process can be undertaken to align the feature points pertaining to the acquired image data with those pertaining to the 3D model.

The alignment of a set of feature points may be accomplished by minimizing the difference between the projected 3D points and the corresponding feature points in the rendered image with some numerical minimization method, e.g., Newton-Raphson minimization. This process updates the pose of the acquired image. In the new pose, the 3D points may be projected through the camera model to image coordinates. The distance in image space between all the feature points and their respectively matched points may be used as an error measurement to minimize. Iterating over several poses allows for Newton-Raphson minimization to estimate an optimal pose. However, among the feature points there may be several points with false matches referred to as outliers. To this end, an iterative method known as RANSAC may be employed. RANSAC may be utilized to fit the feature points of the acquired image to the feature points of the rendered image. RANSAC is, in comparison to other methods, has been found to be particularly good at removing outliers among the feature points in this type of application. RANSAC may be iterated either until an error in position between the street feature points and the rendered 3D model feature points is below a predetermined threshold level or a preset maximum number of iterations have been reached.

In one embodiment, RANSAC has been implemented by selecting a small subset of feature points randomly. A new pose of the acquired image may be adapted to this subset of feature points using a minimization process such as that described above. Each remaining feature point may then be tested against the new camera pose in the same way as in the minimization process. This process may be iterated a number of times and the camera pose with the highest number of approved feature points can be selected. The selected subset of feature points used to find this camera pose along with a list of approved points may all be considered to be inliers, and are thereby correctly matched between the acquired (street-level) imagery and the rendered image. These feature points may be used to estimate a new camera pose using the same minimization process as described above.

The minimization process will now be exemplified in the following. As has been described in the above, the feature points for which 3D coordinates have been calculated may be projected into the acquired image. Next, a process may be undertaken to align the feature points pertaining to the acquired image with those pertaining to the rendered image, which can be done by minimizing the difference between the projected 3D points in the acquired image and the corresponding feature points in the rendered image with Newton-Raphson minimization or the like. Initially, a number of points may be selected in the acquired image, say 5 different points. Then, the difference in image coordinates between the 5 selected points and the corresponding 5 points in the rendered image may be measured. Newton-Raphson minimization may be used, which implies that the pose of the acquired (street-level) image is changed until a minimum in the difference in image coordinates is found. This minimized pose of the acquired (street-level) image, may be examined as to how well the remaining feature points of the acquired image match the remaining feature points in the rendered image. That is, the distance between the remaining feature points of the acquired image and the corresponding remaining feature points of the rendered image may be measured, which gives a number of points considered to be matching, say 100. Thus, for these particular randomly selected feature points, there are a total 5+100=105 matching points.

This process may be repeated a number of times, each iteration giving a new pose of the acquired image and a corresponding number of matching feature points between the two images. For the iteration with the highest number of matching points, the acquired image may be considered to be aligned with the rendered image, and a corresponding pose of the acquired image attained. As a result, the positioning of the acquired image has been greatly improved by using an existing textured 3D model. Subsequently, the improved-position acquired image can be applied to the 3D model to provide greater detail and texture.

At this stage, either the acquired image is considered to be adequately positioned and the process can come to an end, or the positioning process is repeated starting from step 321 in FIG. 3. Hence, a new image may be rendered in the 3D model using the new and improved pose of the acquired (street-level) image and the positioning process continued as described above until a further improved position for the acquired image is found. Once an image is positioned, IMU data or the relative change in GPS position of the images can be used to calculate an approximate position for the next image. Having an enhanced starting pose reduces the calculation needed to automatically position countless acquired images, as well as the risk of matching an image incorrectly. Once correctly positioned, known methods of image-based texturing can be applied to create a 3D model with higher resolution textures. With accurate positions, stereo calculations or other 3D reconstruction methods can be used to improve the geometry of the existing 3D model as well as create a new 3D model based on acquired (street-level) imagery.

Method in accordance with the disclosed embodiments may typically be performed by a device having computing facilities, for instance a computer. This computer typically comprises one or more processors that execute appropriate software stored in associated memory for procuring required functionality. However, other suitable devices with computing capabilities could be used, e.g., an application specific integrated circuit (ASIC), a field programmable gate array (FPGA), a complex programmable logic device (CPLD), etc., in order to position an acquired image using a textured 3D model, while executing appropriate downloadable software stored on computer readable media. As such, by way of example, computer readable media may comprise computer storage media (non-transitory media) and communication media (transitory media). As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is known to the skilled person that communication media typically embodies computer readable instructions, data structures, program modules or other data in a modulated data signal such as a carrier wave or other transport mechanism and includes any information delivery media.

Although exemplary embodiments have been described herein, it should be apparent to those having ordinary skill in the art that a number of changes, modifications or alterations may be made. Thus, the above description of the various embodiments and the accompanying drawings are to be regarded as non-limiting.

The invention claimed is:

1. A method for positioning a two-dimensional (2D) image using a textured three dimensional (3D) model of a region of space, comprising:
    obtaining a textured 3D model that represents a region of space;
    acquiring a 2D image that represents at least a portion of the region of space;
    determining, with respect to the textured 3D model and the acquired 2D image, an initial pose for the acquired 2D image;
    synthesizing a second 2D image from the textured 3D model based on the initial pose;
    aligning the acquired 2D image with the second 2D image to obtain a new estimated pose, wherein the aligning comprises:
        distributing a first set of points in the acquired 2D image using image coordinates,
        distributing a second set of points in the second 2D image using the same image coordinates,
        selecting an area surrounding each point in the first set of points,
        selecting an area surrounding each point in the second set of points, and
        adjusting a position of one or more of the points in the first set of points or the second set of points based on the selected area surrounding the points of the first set of points and the second set of points; and
    positioning the acquired 2D image with respect to the textured 3D model based on the new estimated pose.

2. The method of claim 1, wherein synthesizing the second 2D image comprises rendering the second 2D image from the textured 3D model based, at least in part, on the initial pose.

3. The method of claim 1, wherein synthesizing the second 2D image comprises:
    projecting the acquired 2D image onto the textured 3D model; and
    rendering the second 2D image based, at least in part, on the projection.

4. The method of claim 1, wherein synthesizing the second 2D image comprises:
    projecting the acquired 2D image onto the textured 3D model; and
    obtaining a texture of a surface in the textured 3D model based, at least in part, on the projection, wherein the surface texture comprises the second 2D image.

5. A non-transitory program storage device comprising instructions stored thereon to cause one or more processors to:
    obtain a textured three-dimensional (3D) model that represents a region of space;
    acquire a two-dimensional (2D) image that represents at least a portion of the region of space;
    determine, with respect to the textured 3D model and the acquired 2D image, an initial pose for the acquired 2D image;
    synthesize a second 2D image from the textured 3D model based on the initial pose;
    align, based on a comparison between the acquired 2D image and the second 2D image, the acquired 2D image with the second 2D image to obtain a new estimated pose; wherein the aligning comprises:
        distributing a first set of points in the acquired 2D image using image coordinates,
        distributing a second set of points in the second 2D image using the same image coordinates,
        select an area surrounding each point in the first set of points,
        select an area surrounding each point in the second set of points, and
        adjust a position of one or more of the points in the first set of points or the second set of points based on the selected area surrounding the points of the first set of points and the second set of points; and
    position the acquired 2D image with respect to the textured 3D model based on the new estimated pose.

6. The non-transitory program storage device of claim 5, wherein the instructions to cause the one or more processors to acquire the 2D image comprise instructions to cause the one or more processors to acquire a street-level 2D image of a portion of the region of space.

7. The non-transitory program storage device of claim 5, wherein the instructions to cause the one or more processors to synthesize the second 2D image comprise instructions to cause the one or more processors to render the second 2D image from the textured 3D model based, at least in part, on the initial pose.

8. The non-transitory program storage device of claim 5, wherein the instructions to cause the one or more processors to synthesize the second 2D image comprise instructions to cause the one or more processors to:
    project the acquired 2D image onto the textured 3D model; and render the second 2D image based, at least in part, on the projection.

9. The non-transitory program storage device of claim 5, wherein the instructions to cause the one or more processors to synthesize the second 2D image comprise instructions to cause the one or more processors to:
project the acquired 2D image onto the textured 3D model; and
obtain a texture of a surface in the textured 3D model based, at least in part, on the projection, wherein the surface texture comprises the second 2D image.

10. The non-transitory program storage device of claim 5, wherein the instructions to cause the one or more processors to synthesize the second 2D image comprise instructions to cause the one or more processors to obtain a plurality of second 2D images from around a portion of the textured 3D model corresponding to the initial pose.

11. The non-transitory program storage device of claim 10, wherein the instructions to cause the one or more processors to align comprise instructions to cause the one or more processors to:
determine a displacement between the acquired 2D image and each of the plurality of second 2D images;
select an image from the plurality of second 2D images having a smallest displacement; and
align the acquired 2D image with the selected 2D image to obtain a new estimated pose.

12. The non-transitory program storage device of claim 11, further comprising instructions to cause the one or more processors to repeat the instructions to cause the one or more processors to determine a displacement, select an image, and align the acquired 2D image one or more additional times.

13. The non-transitory program storage device of claim 12, wherein the instructions to cause the one or more processors to repeat are continued until a determined displacement is less than a specified value.

14. The non-transitory program storage device of claim 11, wherein the instructions to cause the one or more processors to determine a displacement comprise instructions to cause the one or more processors to:
identify first features in the acquired 2D image;
identify second features in the second 2D image from the plurality of second 2D images; and
compare the first and second features, wherein the more similar the first and second features the lower the displacement difference between the acquired 2D image and the second 2D image.

15. The non-transitory program storage device of claim 5, further comprising instructions to cause the one or more processors to:
extract texture and/or geometric information from the acquired 2D image; and
include the extracted information into the textured 3D model.

16. The non-transitory program storage device of claim 5, wherein the instructions to cause the one or more processors to align the acquired 2D image with the second 2D image to obtain a new estimated pose comprise instructions to cause the one or more processors to:

generate a scale space representation of the acquired 2D image and the second 2D image based on the first set of points and the second set of points, and
correlate the acquired 2D image and the second 2D image based on the scale space representation.

17. The non-transitory program storage device of claim 16, further comprising instructions to cause the one or more processors to:
measure a correlation between each selected area of the acquired 2D image and the corresponding selected area of the second 2D image, and wherein the adjusting is based, at least in part, on the measured correlations.

18. The non-transitory program storage device of claim 5, further comprising instructions to cause the one or more processors to discard one or more of the first set of points or the second set of points based, at least in part, on information from the textured 3D model.

19. The non-transitory program storage device of claim 5, further comprising instructions to cause the one or more processors to:
calculate, for the one or more adjusted points of the first set of points, 3D coordinates using the textured 3D model as a geographic reference;
project the calculated 3D coordinates into the acquired 2D image; and
minimize a difference between the projected 3D coordinates and corresponding feature points in the second 2D image by updating the initial pose of the acquired 2D image.

20. An electronic device, comprising:
a memory;
one or more processors coupled to the memory and configured to execute instructions stored therein to cause the one or more processors to:
obtain a textured three-dimensional (3D) model that represents a region of space;
acquire a two-dimensional (2D) image that represents at least a portion of the region of space;
determine, with respect to the textured 3D model and the acquired 2D image, an initial pose for the acquired 2D image;
synthesize a second 2D image from the textured 3D model based on the initial pose;
align the acquired 2D image with the second 2D image to obtain a new estimated pose by:
distributing a first set of points in the acquired 2D image using image coordinates;
distributing a second set of points in the second 2D image using the same image coordinates;
select an area surrounding each point in the first set of points,
select an area surrounding each point in the second set of points, and
adjust a position of one or more of the points in the first set of points or the second set of points based on the selected area surrounding the points of the first set of points and the second set of points; and
position the acquired 2D image with respect to the textured 3D model based on the new estimated pose.

* * * * *